Aug. 22, 1933.     G. E. BENNETT     1,923,905
GEAR SHIFT FOR AUTOMOBILES
Filed Oct. 6, 1932     2 Sheets-Sheet 1
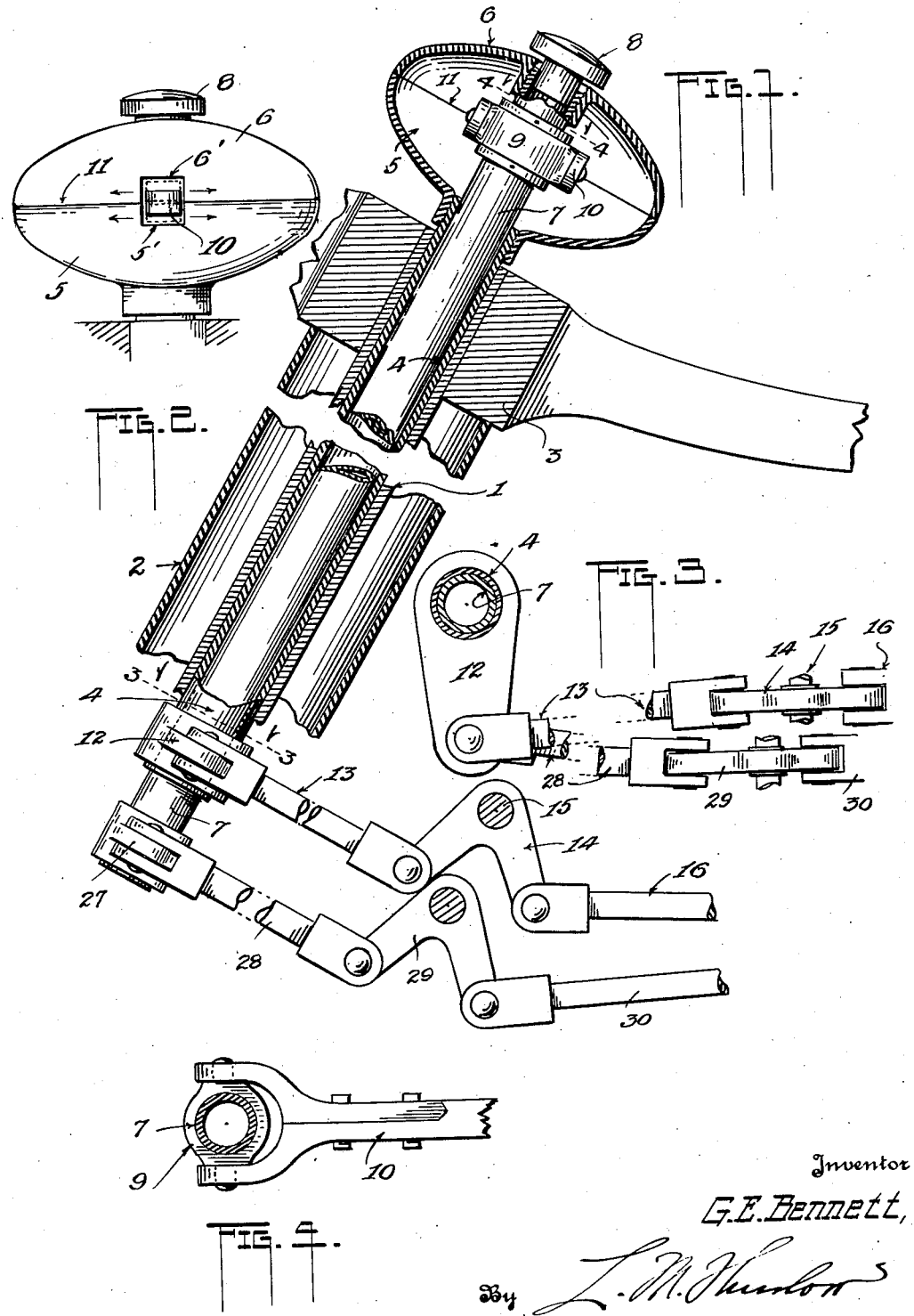

Aug. 22, 1933.   G. E. BENNETT   1,923,905
GEAR SHIFT FOR AUTOMOBILES
Filed Oct. 6, 1932   2 Sheets-Sheet 2
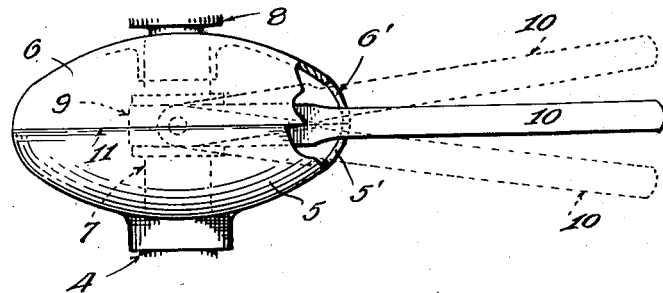
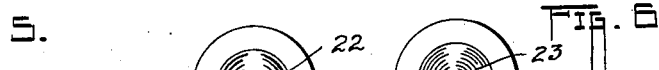
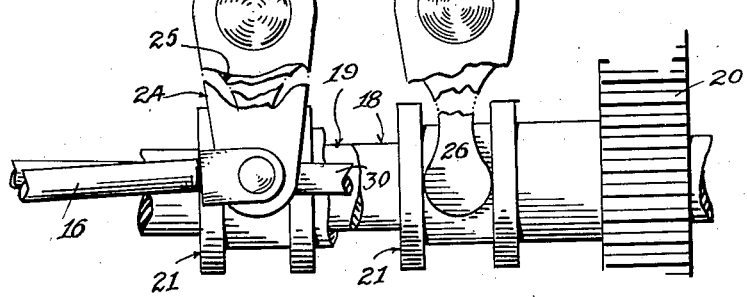
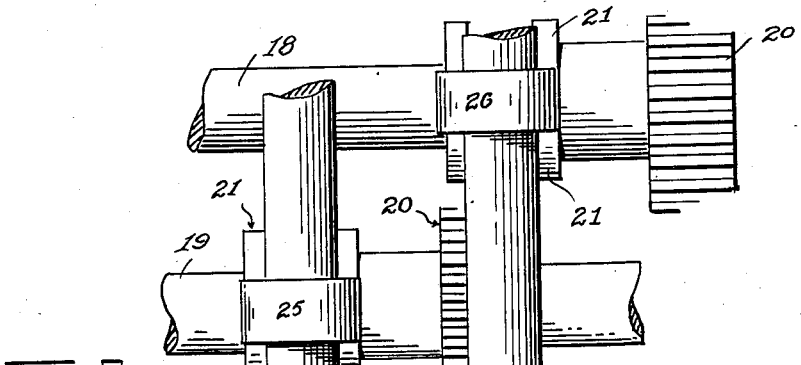
Inventor
G. E. Bennett,
By 
Attorney Patented Aug. 22, 1933

1,923,905

UNITED STATES PATENT OFFICE 1,923,905

GEAR SHIFT FOR AUTOMOBILES

George E. Bennett, Middle Grove, Ill.

Application October 6, 1932. Serial No. 636,474

2 Claims. (Cl. 74—39)

This invention pertains to improvements in gear shifting mechanism for automobile transmissions.

An object of the invention is to provide at and above the steering wheel the shifting-lever for the gears of the transmission and thus replace the usual commonly used shifting-lever in the floor of the car to the end that the space forward of the driver's seat will be unobstructed; that the operator will not be required to exert himself in reaching for such usually placed lever; and that by the use of my arrangement the shifting act can be accomplished more quickly.

Further, an object is to provide an arrangement for gear shifting that can be readily and easily installed in any car without change in the latter or in the steering column on which my structure is mounted.

A still further object is to provide a new arrangement at the steering wheel with which the conventional gear shift movements may be used, all with perfect ease and accuracy.

In the appended drawings I have shown my improved gear shift mechanism in its preferred form wherein—

Figure 1 is a longitudinal sectional elevation of the steering column of a car with my mechanism installed.

Figure 2 is a side elevation of a two-part shell-structure shown in Figure 1 as it would be seen by a person standing at the right side of the car.

Figure 3 is a transverse section of the steering post produced on line 3—3 of Figure 1, showing a shifting-lever in connection therewith.

Figure 4 is a transverse section of parts taken on line 4—4 of Figure 1.

Figure 5 is a rear elevation of the shell-structure of Figures 1 and 2 showing the shifting-lever, and Figures 6 and 7 are respectively an elevation and plan of sufficient structure of the transmission to show the connection of my invention therewith.

In Figure 1 the reference numeral 1 designates part of the usual steering post approximately full size enclosed by the customary tubular column 2 mounted on the car in the usual way, but not so shown, while 3 is the steering-wheel affixed to said post 1.

Installed on this conventional arrangement is the mechanism of my invention which comprises, first, a length of tubing 4 placed within the tubular post 1 to work in a smooth turning fit. Affixed in any suitable manner to the upper end of the tubing is a shell-portion 5. Surmounting this said portion is a companion shell-portion 6 secured to the end of a tube 7 snugly fitting within the tubing 4 and extending with the latter out through the floor of the car, not shown. The open upper end of the tube 7 may be closed by the usual horn-button 8 the electrical connection of which is not illustrated.

Surrounding the tube 7 within the shell portions 5, 6 is a sleeve 9, Figure 4, having oppositely extending studs for receiving the bifurcations of a shifting-lever 10, said sleeve being free to rotate about the tube, being prevented from sliding therealong by any desired means not necessary to describe in detail. As shown in Figure 2 the shell-portions may abut on a central line 11 and at each side of the line of separation each has a notch, that for the portion 5 being denoted by 5' and that for the portion 6 by 6', it being noted that the shifting-lever 10 extends through the opening thus provided. The lever is of such dimensions that it may lie within either notch, being shown in the neutral position in said Figure 2, and in Figure 5 in continuous lines. For convenience in operating the lever it extends directly from the right side of the shell 5, 6 and substantially parallels the car's transverse measurement. When the lever lies as in said Figures 2 and 5 the entire mechanism is in neutral as stated above, or when the notches 5', 6' are in register, Figure 2. Secured to the lower end of the tubing 4 is an arm 12 which extends toward one side of the car, in this instance the left side, there being pivotally attached thereto and extending rearwardly therefrom a linkage consisting of a rod 13 attached, in turn, to one arm of a bell-crank-lever 14 pivotally carried in any suitable manner at 15 on the frame of the car, not shown, while 16 is a rod attached to the other arm of the bell-crank 14 and extending to and having attachment with a member of the usual transmission gearing assembly, parts of which are shown in Figures 6 and 7 wherein, for example, 18 and 19 are a pair of shafts on which are slidable the gears of such transmission, but two of the gears 20 being shown, and in part only. Said shafts 18, 19 carry shifting collars designated at 21 for sliding the gears, this being old and well known. Journaled above and lying at right angles to the named shafts are rock-shafts 22 and 23 from each of which depends an arm, that denoted at 24 having the previously named rod 16 attached thereto. In a customary manner arms 25 and 26 depend from the shafts 22, 23 for engagement with the mentioned shifting collars 21.

The tube 7 also has affixed thereto an arm 27 to which is attached a linkage, the rod 28, bell-crank-lever 29 and rod 30, as before, the latter having connection with the depending arm 31 of the shaft 23.

It will now be seen that by a rotative movement imparted to either of the tubes 4, 7 by means of the shifting-lever 10 any desired shift in the gears of the transmission is possible. As heretofore noted the shell-portions 5 and 6 are separately fixed to the tubes 4, 7 while the lever 10 is free to have rotative movement without respect to them.

An advantage of my arrangement is that the conventional shift is employed and that the movement of the said lever may be in accord with the usual lever arising from the floor of the car, the plane of shifting movement of said lever 10 being a substantially horizontal one instead of a vertical one. Raising the lever from the neutral position into the notch 6' and moving it forward will rotate the shell 6 and its tube 7 and shift the transmission gearing into "reverse". Drawing the lever rearwardly while in the notch 6' places the gears in "low". Again, by dropping the lever into the notch 5' and moving it forward results in "second", and by moving it to the rear "high" is effected.

Since the lever 10 is placed ready at hand at the steering wheel quicker action is possible due to its location in front of the operator who is not required to change his position in making the shift as heretofore. The two shell portions 5, 6 as provided present an ornamental appearance but from a practical standpoint they constitute, in effect, separate lever-arms to be engaged by the said lever 10.

While I have described and shown a specific type of linkage from the arms 12 and 27 rearwardly to the transmission it is to be understood that any other arrangement may be employed.

An important point in the use of my structure is that no changes whatever are required in its installation on any car. After removing the usual horn-button the tubes 4 and 7 can be slipped into position and the said button replaced, finding its position on the tube 7. Further the structure itself is not complicated in any way, nor does it require expensive parts, or require expensive machining in its production.

Although a specific arrangement has been shown for mounting the tubes 4 and 7, as well as a specific form of the shell-portions 5 and 6 it is to be clearly understood that changes may be made within the meaning of the invention and the appended claims.

However, the said shell portions 5 and 6 together form a closed hollow body and abut each other thereby enclosing the upper portion of the tube 7 and the pivoted inner end of the lever 10 thus creating an attractive finish for the steering column above the wheel 3 besides forming a practically tight enclosure for the operating parts with, including the terminal of said tube 7 where it bears upon the tube 4 thereby excluding dust to a great extent. The arrangement is most simple, too, from the fact that since each shell portion 5, 6 is provided with its notch 5', 6', respectively, they form the only guides necessary for the lever 10 in the shifting movements thereof, and that when said lever is shifted while in the notch of one shell the edge of the opposite shell closes said notch so that said lever is positively imprisoned and cannot be moved on its pivot on the sleeve 9 until both notches are brought into register. Clashing of gears and damage thereto is thus wholly impossible. Otherwise stated, the abutting edges of the shells themselves fix the lever so that it can be moved in but one plane while in a position other than a neutral position or when the notches coincide or register.

I claim:

1. In combination with the tubular steering post and the shifting gears of an automobile, a pair of members within and extending axially of said post, each member having operative connection with one of the said gears, a separate shell portion affixed to each of the members, the two portions being inverted one upon the other and substantially abutting at their edges, adapted for rotation relative to each other and together forming an enclosure, each shell portion having a notch in its edge arranged to register one with the other, the edge of one shell portion closing the notch of the other portion in certain positions of the portions relatively, and a lever mounted at one end within and having free movement with respect to the shell portions and extending outside the same adapted to rotate one or the other of them by engagement in the notch thereof, the edge of one shell portion forming a retaining guide for said lever when the latter is in the notch of the other shell portion.

2. The combination with the steering column of an automobile and the gears of the gear shifting mechanism, of a pair of members one within the other, both being coaxial with the axis of the steering column, the end of one of the members extending beyond the end of the other and each having operative engagement with one of the gears, a pair of shell portions, inverted one upon the other and lying substantially in abutting relation at their edges creating an enclosure, each shell portion being affixed to one of the said members and rotatable with respect to each other, each shell having a notch therein opening upon the edge of the other, and a lever pivotally mounted within the shells and free to swing in two planes at right angles to each other and in planes paralleling each other, said lever extending through the abutting portions of the shells and free to enter the notch of either of the same, the edge of one shell portion forming a guide for the lever when the latter is lying within the notch of the other shell portion.

GEORGE E. BENNETT.